Feb. 25, 1969     R. B. GARDNER     3,429,616
TRUSS PALLET
Filed Nov. 9, 1966     Sheet 1 of 2
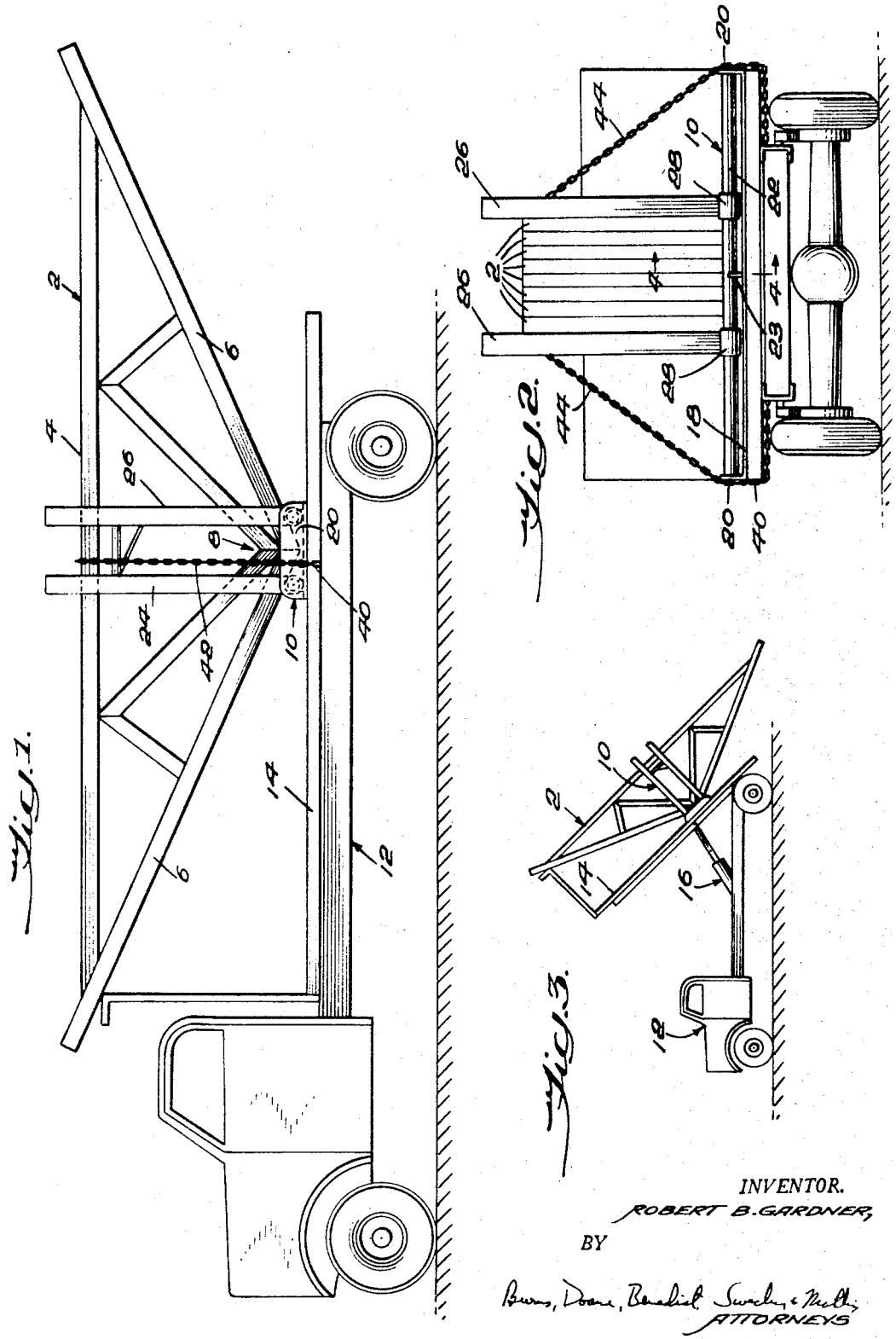
INVENTOR.
ROBERT B. GARDNER,
BY
ATTORNEYS

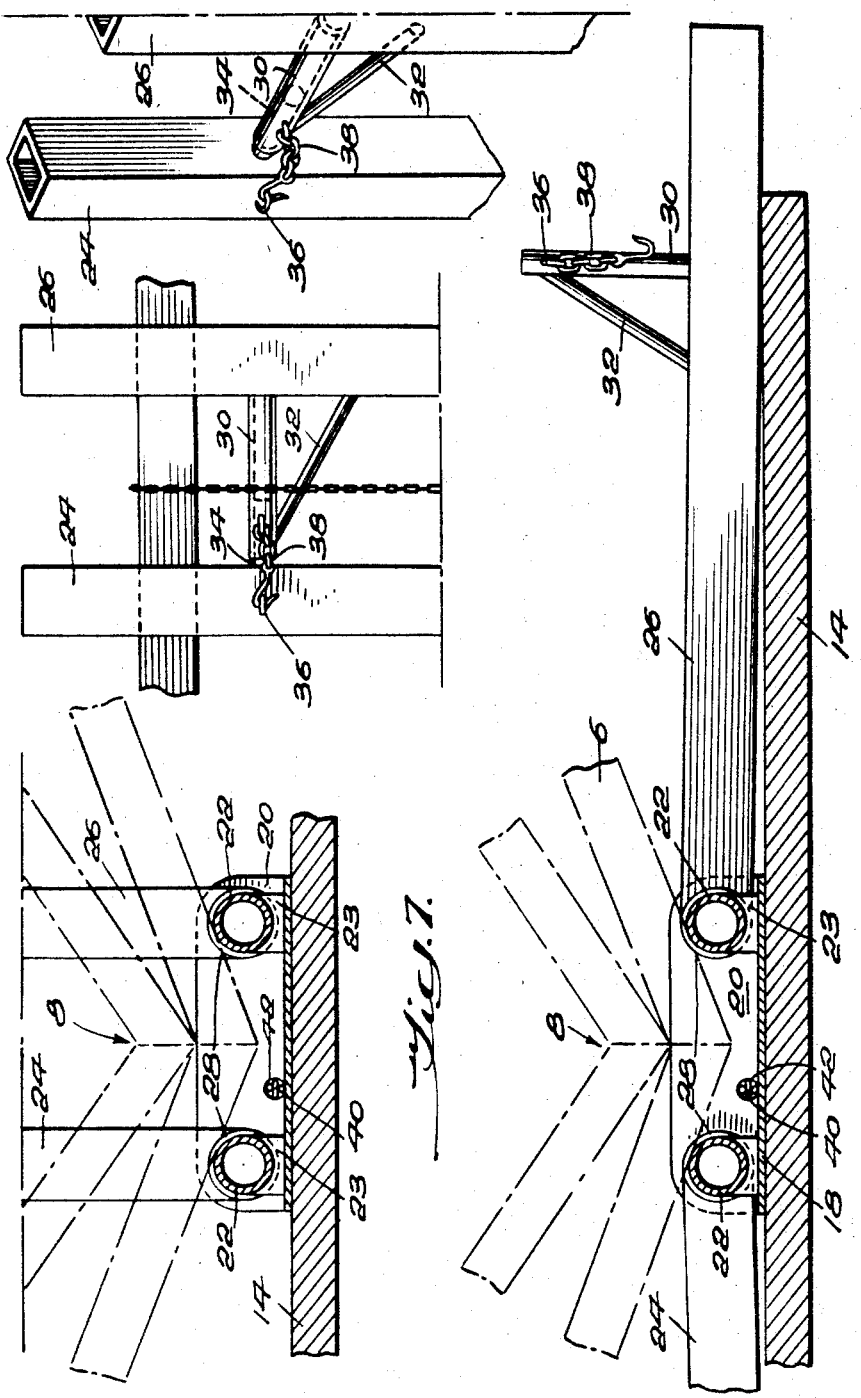

United States Patent Office 3,429,616
Patented Feb. 25, 1969

3,429,616
TRUSS PALLET
Robert B. Gardner, P.O. Box 496,
Ashland, Va. 23005
Filed Nov. 9, 1966, Ser. No. 593,208
U.S. Cl. 298—17          8 Claims
Int. Cl. B60p 1/64; B65g 67/24; B65d 19/26

ABSTRACT OF THE DISCLOSURE

A truss pallet for supporting wood roof trusses during transportation on a vehicle having a base with a pair of transverse rods upon which two pairs of posts are mounted adapted to receive the trusses between the pairs of posts in inverted relation. The rods are spaced apart to be disposed immediately on opposite sides of the center joint of each roof truss and support pairs of posts which normally stand upright, being adjustable if need be to hold the roof trusses securely in place. Provision is made for locking the upright posts of each pair together in spaced relation.

This invention relates to conveying apparatus and more particularly to apparatus for transporting wood roof trusses.

Wood roof trusses are long flat structures which are used in housing construction to replace conventional rafters. These roof trusses are fabricated at lumber yards and assembly plants and then transported to the building site where they are to be used. The roof trusses are usually between 20 feet and 40 feet long and are about 2 inches to 4 inches wide. Due to their shape and size roof trusses are difficult to transport on conventional flat bed trucks, that are customarily used by lumber yards for delivering lumber.

Because of their length, the trusses usually cannot be laid flat on the bed of the truck, and to overcome this problem, trusses are often laid flat across the headboard of the truck body and extend over the tail end of the truck bed. This arrangement is unsatisfactory, because the trusses are stressed transversely, which tends to weaken the trusses, and there is a danger that the trusses may slide off the end of the truck bed. Many states limit the distance that a load may extend beyond the rear of a truck body, which restricts this mode of transporting to trusses of shorter lengths.

Another difficulty with this arrangement is that the trusses must be hand-loaded on the truck bed, usually one at a time, and this involves two or more workmen and considerable time in lashing the trusses to the bed of the truck. Furthermore, when the trusses reach the building site, it is difficult to unload them from the truck bed when they are lying flat across the headboard of the truck body. In handling the roof trusses during loading and unloading, there is the additional problem of the trusses becoming damaged, particularly at the ends of the trusses. Also, workmen may be injured, if the trusses should drop accidentally while they are being unloaded.

Accordingly, it is an object of this invention to provide an improved method and apparatus for transporting wood roof trusses.

It is a further object of this invention to provide a method and apparatus for safely and efficiently loading and unloading wood roof trusses from a truck body.

Another object of this invention is to provide a method and apparatus for unloading wood roof trusses from a truck bed without damaging the roof trusses.

These objects are accomplished in accordance with a preferred embodiment of the invention by loading the roof trusses in vertical relation side by side on the pallet of this invention, securing the trusses to the pallet, lifting the pallet and depositing it on the bed of a conventional flat bed dump truck, securing the pallet to the bed of the truck, and subsequently unloading the trusses by disconnecting the trusses from the pallet and sliding them off the rear of the truck bed. The trusses are supported upside down on the horizontal supports of the pallet. Upright braces on the sides of the pallet support the trusses in vertical relation on the pallet. The upright posts are movable to a lowered position in order to facilitate loading or unloading of the trusses on the pallet.

This preferred embodiment of the invention is illustrated in the accompanying drawings in which:

FIG. 1 is a side elevational view of the pallet of this invention loaded with roof trusses and mounted on a conventional flat bed dump truck;

FIG. 2 is a rear elevational view of the truck and pallet;

FIG. 3 is a schematic view showing the position of the trusses when the truck bed is raised to an unloading position;

FIG. 4 is a cross sectional view of the pallet and truck along the line 4—4 in FIG. 2;

FIG. 5 is a detail view of the post latch;

FIG. 6 is a perspective view of the post latch; and

FIG. 7 is a cross sectional view of the apparatus as in FIG. 4, but showing the posts in lowered position.

Referring to FIG. 1, a conventional wood roof truss 2 includes a bottom chord 4 and top chords 6 that are joined together at the peak joint 8. The wood members of the roof truss may be joined together by nailing plates which are secured over the joints between the members to form a flat structure with the wood members lying in coplanar relation.

In FIG. 1, a plurality of roof trusses 2 are shown as secured in a truss pallet 10 of this invention which is mounted on a truck 12. The truck 12 is shown schematically in FIGS. 1 and 3 and has a conventional flat bed 14. The truck 12 includes a hoist device 16 for swinging the bed 14 about a transverse axis at the rear of the truck chassis, as shown in FIG. 3.

The truss pallet 10 of this invention includes a base 18 having upright opposite end walls 20. A pair of bars 22 are secured at their opposite ends to the end walls 20. The bars 22 are spaced above the base 18, as shown in FIGS. 4 and 7. Preferably, the bars 22 are in the form of hollow tubes in order to reduce the weight of the pallet.

A pair of front posts 24 and a pair of rear posts 26 are mounted for vertical swinging movement on the respective bars 22 by means of collars 28 at the baes of each post. The collars are assembled in telescoping relation over the bars 22, so that the posts 24 and 26 may slide longitudinally along the bars 22. The collars also permit the posts to swing vertically with respect to the bars 22.

The posts 24 and 26 are held together in an upright position by a latch bar 30 which extends outwardly from each of the rear posts 26. The latch bar 30 on each post 26 is in the form of a hollow tube and is supported rigidly by a brace 32. A peg 34 on each of the front posts 24 is in posiiton to be inserted in the end of the tube 30. A bracket 36 is secured at the side of each post 24 and a chain 38 fastened at one end on the bar 34 has a hook on the opposite end which is received in the bracket 36 to hold the bar 30 in engagement with the peg 34. Thus, the posts 24 and 25 are held together in an upright position by the peg 34 which extends into the latch bar 30 a sufficient distance to maintain the peg and bar in axial alignment.

When the hook on the chain 38 is removed from the bracket 36, the peg 34 is free to slide out of the end of the tube 30 and both of the posts 24 and 26 may swing vertically until they reach the horizontal position, as shown in FIG. 7, resting on the surface of the truck bed 14.

The pallet 10 may be secured on the bed 14 of a truck by any suitable means, such as a chain 40 which passes through openings 42 in the upright end walls 20. The chain 40 extends across the top of the base 18, through the end walls 20 and under the bed 14. The ends of the chain are joined together after applying tension in order to clamp the base 18 tightly against the surface of the truck bed 14. A second chain 42 passes across the bottom chords 4 of the roof trusses 2 and extends under the truck bed 14, or it is otherwise secured to the truck bed for maintaining the trusses and the pallet firmly in place on the truck bed 14.

An empty pallet 10 may be placed adjacent to the truss fabrication apparatus, and as the trusses are completed, they may be stacked on the pallet. While the pallet 10 is being loaded with roof trusses 2, the posts 24 and 26 are positioned near the end walls 20. The posts at one end of the pallet may be secured together in an upright position to serve as a support for the trusses as they are deposited one at a time on the pallet. The posts 24 and 26 at the opposite side of the pallet are disconnected and lowered to the position shown in FIG. 7. This permits the trusses to be easily placed in position on the pallet. When the desired quantity of roof trusses has been placed on the pallet 10, with the top chords 6 resting on the horizontal bars 22, as shown in FIG. 7, the other pair of posts 24 and 26 are raised to a vertical position, as shown in FIG. 5, and connected together to provide lateral support for the roof trusses. It may be necessary to push the pairs of posts toward each other along the bars 22 until all of the trusses 2 are positioned approximately vertically and are held close together by the posts 24 and 26. Any suitable arrangement may be used for securing the trusses to the pallet. The pallet should be separately secured to the truck bed 14.

When the pallet 10 has been loaded with roof trusses 2, the pallet may be picked up by a conventional fork lift truck and transported from the truss fabrication area to the bed 14 of the dump truck 12. The loaded pallet is then secured to the bed of the truck by passing the chain 40 through the holes 42 in the end walls 20 and under the bed 14 of the truck 12, and then fastening the ends of the chain together. As shown in FIGS. 4 and 7, the holes 42 are offset from the center of the end walls so that the chain 40 does not interfere with the peak joint 8 of the trusses supported on the horizontal bars 22. The chain 42 may then be fastened over the loaded pallet, as shown in FIGS. 1 and 2.

When the truck 12 reaches a job site, the bed 14 is raised, as shown in FIG. 3, by the hoist 16 until the rear end of the roof trusses 2 reaches the ground. Further raising movement causes the front top chord 6 to pivot on the rearward horizontal bar 22 until the peak joint 8 is positioned above the rearward horizontal bar 22. The trusses are then free to slide down the front top chord 6 as the truck 12 is driven forward. Preferably, all of the trusses on the pallet are secured together by steel strapping or other suitable means, so that they are held together in a bundle and, when unloaded from the pallet in this manner, the bundle of trusses is self-supporting due to the width of the bundle. Each truss in the bundle rests on its top chord which is designed to withstand compression loading and therefore the trusses are not damaged in any way while they remain in this position. The bundle may then be sepaarted and the trusses may be used one at a time.

There is an advantage in unloading the trusses from the rear of the truck in accordance with this invention. The truck can be backed into narrow areas between adjacent houses in a housing development, for example, and may be positioned exactly where they are needed .

Since the posts 24 and 26 are adjustable lengthwise of the bars 22, the trusses may be centered transversely of the body 14 and may be adjusted for various widths of loads of roof trusses. Furthermore, since the posts at both sides of the pallet can be disconnected and lowered, the trusses may be loaded and unloaded from either side of the truck bed 14, if that is desired.

I claim:

1. A pallet for supporting wood roof trusses comprising base means, a first pair of posts at one side on said base means and a second pair of posts at an opposite side of said base means, said posts being supported on said base means, means for adjusting the distance between said first and second pairs of posts, said posts being normally arranged in an upright position relative to said base means, and means for swinging each of the posts of one pair toward and from the other post of said pair and away from said upright position, whereby roof trusses may be loaded on said base means between said pairs of posts while said posts are displaced out of the way.

2. The pallet according to claim 1 wherein said base means includes bars extending between said first and second pairs of posts.

3. The pallet according to claim 2 wherein said posts are mounted on said bars and are movable longitudinally of said bars.

4. The pallet according to claim 2 wherein said adjusting means includes a plurality of collars on said bars mounted thereon for sliding movement lengthwise of the respective bars and for swinging movement relative thereto, said posts being mounted individually on said collars, and means for latching together said posts of each pair in an upright position.

5. The pallet for supporting wood roof trusses comprising base means, a first pair of posts at one side of said base means and a second pair of posts at an opposite side of said base means, means for adjusting the distance between said first and second pairs of posts, said posts being normally arranged in an upright position relative to said base means, and means for temporarily displacing at least one of said pairs of posts away from said upright position, whereby roof trusses may be loaded on said base means between said pairs of posts while said posts are displaced out of the way, said base means including bars extending between said first and second pairs of posts, said adjusting means including a plurality of collars on said bars, said posts being mounted individually on said collars, and means for latching together said posts of each pair in an upright position, said latching means including a tube on one post and a peg on the other post of said pair, said tube extending outward from said post, toward said other post, said peg being aligned with said tube when said posts are positioned upright and said peg extending in said tube in telescoping relation, and means for locking said peg and tube against relative axial movement.

6. The pallet according to claim 4 wherein said base means includes a flat base plate and upright end walls at opposite ends of said base plate, means for securing the ends of said bars in said end walls, said bars being spaced above said base plate and being substantially parallel to each other.

7. In combination with a truck of the type having a bed that swings vertically about a horizontal axis adjacent the rear wheels of the truck, a pallet for transporting roof trusses, means for securing said pallet to said truck bed, said pallet including a pair of bars extending transversely of said truck bed in fixed positions relative thereto and spaced closely adjacent to each other to be disposed closely against opposite sides of the apex of each roof truss held in inverted relation therebetween, and laterally adjustable upright supports on said bars for supporting the roof trusses in side-by-side vertical relation with the peak joint positioned between the bars, whereby swinging of said truck bed upwardly causes the rearward end of the trusses to engage the ground and the peak joint pivots about the forward bar and the trusses then are free to slide off of the truck bed.

8. The apparatus according to claim 7 wherein said bars are substantially parallel to each other and to said horizontal axis, and are spaced forwardly of said truck bed horizontal axis.

References Cited

UNITED STATES PATENTS

| | | | |
|---|---|---|---|
| 1,996,695 | 4/1935 | Bigley | 280—144 |
| 2,388,304 | 11/1945 | Ackerman | 280—144 X |
| 2,494,997 | 1/1950 | Geistert | 214—84 X |
| 3,107,802 | 10/1963 | Blonsky | 214—515 |
| 3,154,207 | 10/1964 | Long | 214—501 |
| 3,219,211 | 11/1965 | Malcom | 214—77 X |
| 3,221,911 | 12/1965 | Modloff | 298—17 X |

RICHARD J. JOHNSON, *Primary Examiner.*

U.S. Cl. X.R.

214—515